US012602488B2

(12) United States Patent
Sabetta et al.

(10) Patent No.: US 12,602,488 B2
(45) Date of Patent: Apr. 14, 2026

(54) IDENTIFYING SECURITY-RELEVANT COMMITS THROUGH ARCHITECTURAL CONTEXT

(71) Applicant: SAP SE, Walldorf (DE)

(72) Inventors: Antonino Sabetta, Mouans-Sartoux (FR); Rocio Cabrera Lozoya, Antibes (FR)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 18/541,608

(22) Filed: Dec. 15, 2023

(65) Prior Publication Data

US 2025/0200189 A1      Jun. 19, 2025

(51) Int. Cl.
| | |
|---|---|
| *G06F 21/57* | (2013.01) |
| *G06F 8/71* | (2018.01) |
| *G06F 21/51* | (2013.01) |
| *G06F 21/56* | (2013.01) |

(52) U.S. Cl.
CPC .............. *G06F 21/577* (2013.01); *G06F 8/71* (2013.01); *G06F 21/51* (2013.01); *G06F 21/563* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2014/0013415 | A1* | 1/2014 | Sabetta | H04L 63/20 |
| | | | | 726/16 |
| 2017/0177310 | A1* | 6/2017 | Mathias | G06F 8/36 |
| 2019/0347424 | A1* | 11/2019 | Bezzi | G06F 21/577 |
| 2022/0129261 | A1* | 4/2022 | Cabrera Lozoya | G06F 8/40 |

FOREIGN PATENT DOCUMENTS

WO      WO2022149088 A1      7/2022

OTHER PUBLICATIONS

Wu et al., "Enhancing Security Patch Identification by Capturing Structures in Commits,", Jul. 25, 2022, IEEE Transactions on Dependable and Secure Computing, doi: 10.1109/TDSC.2022. 3192631. (Year: 2022).*
Aladics et al., "An AST-based Code Change Representation and its Performance in Just-in-time Vulnerability Prediction", Mar. 29, 2023, https://doi.org/10.48550/arXiv.2303.16591 (Year: 2023).*

(Continued)

*Primary Examiner* — Philip J Chea
*Assistant Examiner* — Bin Qing Zheng
(74) *Attorney, Agent, or Firm* — Fountainhead Law Group, PC

(57) ABSTRACT

Security-relevant commits are important to identify because they may provide an opportunity for a malicious party to identify vulnerabilities in the software that a malicious party can take advantage of. Methods and apparatuses are described herein combine the commit with information related to the architectural context in which those changes appear to predict the likelihood that a given commit contains security-relevant software code changes. The security-relevant code changes may be code changes to fix an existing security risk or code changes that may introduce a potential security risk.

18 Claims, 6 Drawing Sheets

100

(56)　　　　　　References Cited

OTHER PUBLICATIONS

Anonymous: "Feature selection—Wikipedia", , Oct. 13, 2019 (Oct. 13, 2019), XP055788078, Retrieved from the Internet: URL:https://en.wikipedia.org/w/index.php?title=Feature_selection&oldid=920990787 [retrieved on Mar. 22, 2021].

Jatnika Derry et al: "Word2Vec Model Analysis for Semantic Similarities in English Words", Procedia Computer Science, Elsevier, Amsterdam, NL, vol. 157, Jan. 1, 2019 (Jan. 1, 2019), pp. 160-167, XP085846516, ISSN: 1877-0509, DOI: 10.1016/J.PROCS.2019.08.153 [retrieved on Oct. 1, 2019].

Rocio Cabrera Lozoya et al: "Commit2Vec: Learning Distributed Representations of Code Changes", arxiv.org, Cornell University Library, 201 Olin Library Cornell University Ithaca, NY 14853, Nov. 18, 2019 (Nov. 18, 2019), XP091085033, DOI: 10.1007/S42979-021-00566-Z.

Tamas Aladics et al: "An AST-based Code Change Representation and its Performance in Just-in-time Vulnerability Prediction", arxiv.org, Cornell University Library, 201 Olin Library Cornell University Ithaca, NY 14853, Mar. 29, 2023 (Mar. 29, 2023), XP091471329. Extended European Search Report for the EU Application No. 24213176.1. Apr. 10, 2025. 11 pages.

* cited by examiner

400

| Receiving a source code commit | 410 |

↓

| Generating a message vector | 420 |

↓

| Generating a commit vector | 430 |

↓

| Generating an architecture-aware commit vector | 440 |

↓

| Processing, through a neural network model, the commit vector, message vector, and architecture-aware commit vector to determine likelihood that the source code change creates a potential security risk | 450 |

IDENTIFYING SECURITY-RELEVANT COMMITS THROUGH ARCHITECTURAL CONTEXT

BACKGROUND

Unless otherwise indicated herein, the approaches described in this section are not prior art to the claims in this application and are not admitted to be prior art by inclusion in this section.

Adoption of 3rd party open-source components has become pervasive in today's software industry as more software products are built as a composition of proprietary closed-source components and free open-source software (OSS) libraries. And while the use of these OSS libraries can speed up the development process, it is also true that the quality assurance practices and maturity of the developers of these 3rd party libraries can vary substantially. $3^{rd}$ parties may periodically provide updates to their software and the timely detection of security-relevant development changes is key. Late detection and reaction to security-relevant changes leaves a window of opportunity for attackers, who can monitor the repository of popular components, observe security fixes in the updates, infer the security fix corresponds to a security flaw, and exploit the security flaw during the period of time from the commit being pushed to the repository and a release being published for client projects to adopt. Thus, there is a need to accurately and efficiently identify security-relevant commits.

DETAILED DESCRIPTION

Described herein are methods and apparatuses to identify security-relevant commits. A commit is an operation in a version control system which sends software (or source) code changes to a repository. The commit may be retrieved from the repository by a target system to update software running on the target system at a later point in time. A commit created to fix a security issue in the software is known as a security-relevant commit. A commit that may introduce a security issue into the software is also known as a security-relevant commit. Security-relevant commits are important to identify because they may provide an opportunity to identify vulnerabilities in the software that a malicious party can take advantage of. This becomes more relevant as software solutions include more software components built by multiple independent third parties. Methods and apparatuses described herein combine the commit with information related to the architectural context in which those changes appear to predict the likelihood that a given commit contains security-relevant software code changes. Annotations may be attached to architecture elements (structural, such as components, connectors, interfaces, or behavioral, such as protocols) to extend the characterization of commits. Using this extended representation (commit message+commit source code+architectural context) one can train a more accurate machine learning model for different code analysis tasks. It will be evident, however, to one skilled in the art that embodiments as defined by the claims may include some or all of the features in these examples alone or in combination with other features described below, and may further include modifications and equivalents of the features and concepts described herein.

Figure 1:
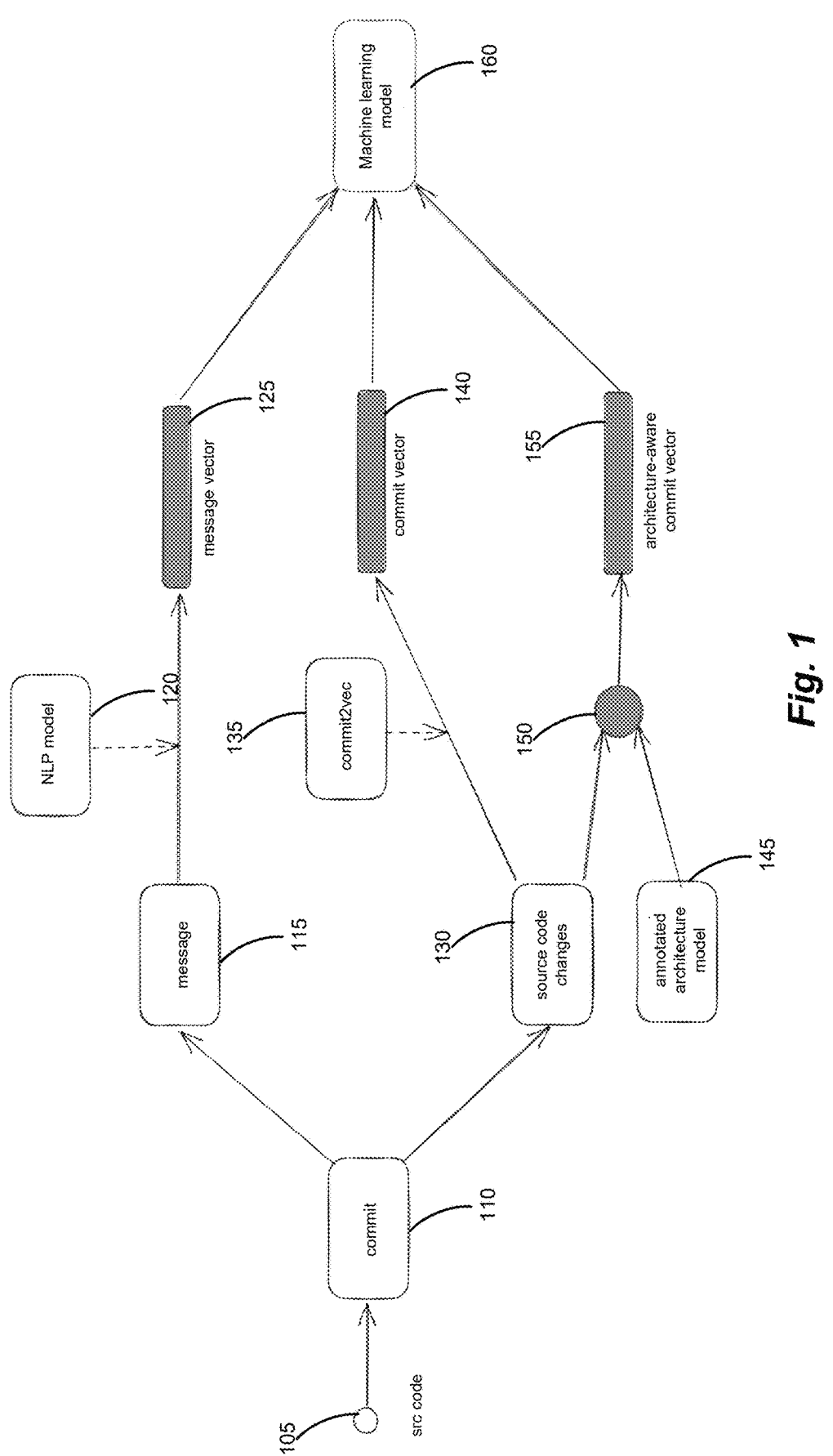
FIG. 1 illustrates a workflow for identifying security-relevant commits according to some embodiments.

FIG. 1 illustrates a workflow for identifying security-relevant commits according to some embodiments. Workflow 100 may be executed on one or more computing systems. An exemplary computer system is described in FIG. 5 and FIG. 6. As shown, source code 105 can belong to a software program and can include a large number of files, each file containing source code that represents different parts of the software program. The software program can be a program being developed by the target system or can be a program developed by a third party. When changes are made to the software program, commit 110 can be generated and stored in a version control system such as a versioned repository. Workflow 100 begins by receiving commit 110 from a version repository. Workflow 100 can analyze commit 110 in view of the architectural context of source code 105 to predict whether commit 110 is a security-relevant commit. The prediction may be output from machine learning model 160.

Commit 110 can include two parts—message 115 and source code changes 130. Source code changes 130 may store the actual changes made to the source code. In one example, the changes may be represented as lines of code that are removed and lines of code that are added to files in the source code. In another example, the changes may be represented as words removed and added to the software code. Message 115 may contain words, sentences, or paragraphs in natural language that provide a description of the purpose behind source code changes 130. For example, description may be that the source code changes enable an encryption or that the source code changes correct a security vulnerability in the software. Message 115 or source code changes 130 may also include a summary of the files that were changed and/or the total number of additions and deletions.

Workflow 100 continues by processing message 115 through a Natural Language Processing (NLP) model 120 to generate message vector 125. The conversion from the textual commit message to a numerical vector is done using one of the many existing text embedding methods (such as, for instance, word2vec or the like). The result of vectorizing a commit message is an n-dimensional numerical vector (where n is usually in the hundreds or few thousands). Message vector 125 is one input into machine learning model 160.

Workflow 100 can also process source code changes 130 through commit2vec 135 to generate commit vector 140. Commit2vec 125 is a neural network model or a machine learning model. The commit2vec model has been fine-tuned to generate commit vectors that represent source code in such a way that a classifier model can use the information encoded in those vectors to distinguish security-relevant code changes. Therefore, the commit vector 140 generated may represent the source code itself. In one embodiment, representation of the source code changes as a commit vector is simply compressing information while preserving and potentially highlighting what matters in order to decide on the security-relevance of the code. The commit vector 140 is a second input into machine learning model 160.

Workflow 100 can also process (at 150) source code changes 130 along with an annotated architecture model 145 to generate an architecture-aware commit vector 155. Details on the processing to generate the architecture-aware commit vector 155 is described in FIG. 2. The architecture-aware commit vector 155 is a third input into machine learning model 160. Similar to the commit vector, the architecture-aware commit vector may be a multi-dimensional numerical representation.

In one embodiment, the generation of message vector 125, commit vector 140, and architecture-aware commit vector 155 can occur in parallel while in other embodiments, the vectors can be generated in any order. Once all three vectors have been generated, workflow 100 can continue by utilizing machine learning model 160 to process the three input vectors to generate a prediction of whether commit 100 is a security-relevent commit. In one example, the prediction can be a value between 0 to 1 which expresses the likelihood of the commit being a security-relevant commit (0 being lowest, 1 being highest). In one embodiment, workflow 100 predicts whether a commit contains source code changes that fix a potential security risk. If the commit has a high likelihood of addressing a security issue in the software project, then it may be desirable for the target system to prioritize integrating that commit into its software. In another embodiment, workflow 100 predicts whether a commit contains source code changes that may present a security risk. If the commit has a high likelihood of introducing a security issue with the software project, then the target system may in turn execute safeguards to prevent attacks from bad actors. For example, the target system may decide not to integrate a commit into its source code if there is a high likelihood of the commit having a security risk. The target system may also share this knowledge with the developer of the software project to investigate into the potential security risk. The target system may also look into updating its software or systems to minimize the potential security risk. It is to be understood by one of skill in the art that the neural network models in workflow 100 can be trained to predict, source code changes that may introduce a security risk or vulnerability, source code changes that may repair an existing security risk or vulnerability, or both.

In one embodiment, machine learning model may receive a concatenation of message vector 125, commit vector 140, and architecture-aware commit vector 155. Machine learning model 160 can be a neural network model that has been trained to identify security-relevant commits. Security-relevant commit is defined as a commit which has vulnerabilities or other security-relevant risks.

Figure 2:
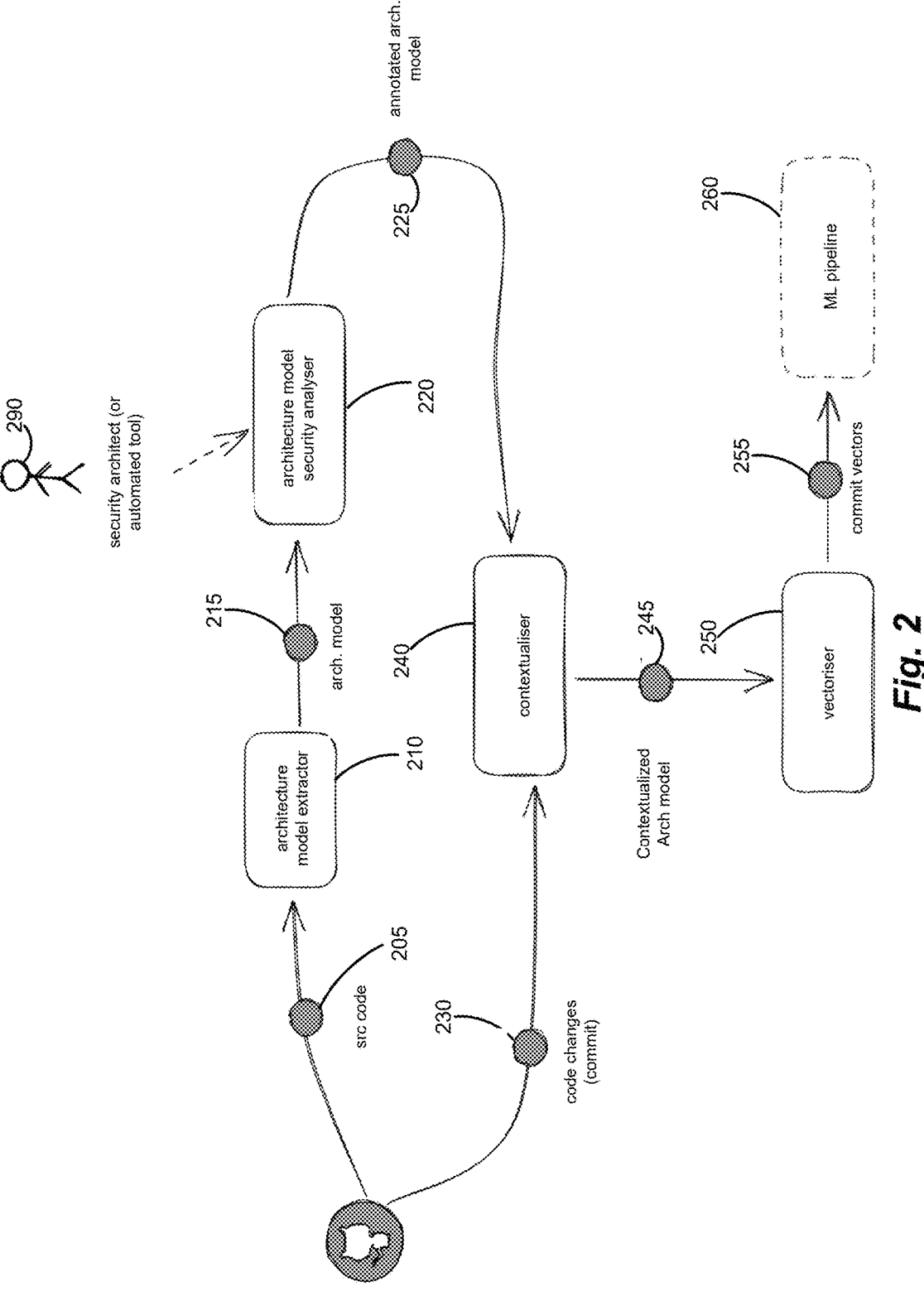
FIG. 2 illustrates a workflow for generating an architecture-aware commit vector according to some embodiments.

FIG. 2 illustrates a workflow for generating an architecture-aware commit vector according to some embodiments. Workflow 200 can be executed on one or more computing systems with sufficient memory and computing power. The computing systems may be one or more of the computing systems in FIG. 1. Workflow 200 begins with architecture model extractor 210 receiving source code 205 to generate architecture model 215. In one example, source code 205 can be a snapshot of source code 105 at a specific point in time retrieved from a source code repository. Architecture model extractor 210 may extract the source code tree from the source code repository and generate an abstract representation of the architecture of the software project, known as architecture model 215. In one example, an existing architecture model of the software project may be used. In other examples, architecture model 215 can be automatically extracted from source code 205 through the use of existing architecture reconstruction techniques.

In one embodiment, the mapping between software code and architecture model 215 occurs when the architecture model 215 is extracted from the source code by architecture model extractor 210. In one example, each line of software code can be mapped to one architecture element. In other examples, the mapping can be a many to one mapping (multiple lines of software code mapped to one architecture element or one line of software code mapped to multiple architecture elements).

In another embodiment, architecture model extractor 210 includes a graphical user interface to aid the software developer/architect to link architecture elements to lines of code in a manual manner in step 210. The user interface may present a view of the architecture model where the elements that do not have a corresponding source code element associated are highlighted with a suitable graphical convention (icon, color, line pattern or thickness, etc). For each of these elements, the software developer/architect can obtain the set of code elements that can be assigned to it. The set may be presented in a hierarchical view, so that the software developer/architect can navigate the code base by following the natural structure of folders and files, packages, classes, data type definitions, methods/functions, etc.

Workflow 200 can continue by processing architecture model 215 through architecture model security analyzer (analyser) 220. Architecture model security analyzer 220 may be configured to annotate architecture model to identify architecture element or elements in the architecture model 215 that contain a security risk or is a potential security risk. The output of architecture model security analyzer 220 is annotated architecture model 225. Annotated architecture model 225 is an annotated model where each of the concerned architecture elements (components and connectors) has been annotated with security-related information: for example, annotations can indicate that the component is a source or sink of sensitive data, a data storage element, a component or communication channel that is protected by authentication, or authorization, or encryption, a channel that crosses a trust boundary, etc. This additional information may be provided as annotations that are manually added by security architect 290, by an automated mechanism, or a combination of the two.

Workflow 200 can continue with contextualiser 240. The goal of the contextualiser 240 is to identify the architecture elements in annotated architecture model 225 that are affected by code changes 230. These architecture elements can be flagged so that they can be analyzed to predict whether they pose a security-relevant risk. Code changes 230 can be the source code changes that are stored in a commit. For example, code changes 230 can be source code changes 130 in FIG. 1. In one example, each line of software code that has been changed can be mapped to one architecture element. In other examples, the mapping can be a many to one mapping (multiple lines of software code mapped to one architecture element or one line of software code mapped to multiple architecture elements). In one embodiment, architecture model extractor contextualiser 240 may include a graphical user interface to aid the software developer/architect to flag architecture elements in annotated architecture model 225 that are impacted by code changes 230. After the mapping, contextualiser 240 generates contextualized architecture model 245, which is simply annotated architecture model 225 with information on the code changes.

Figure 3:
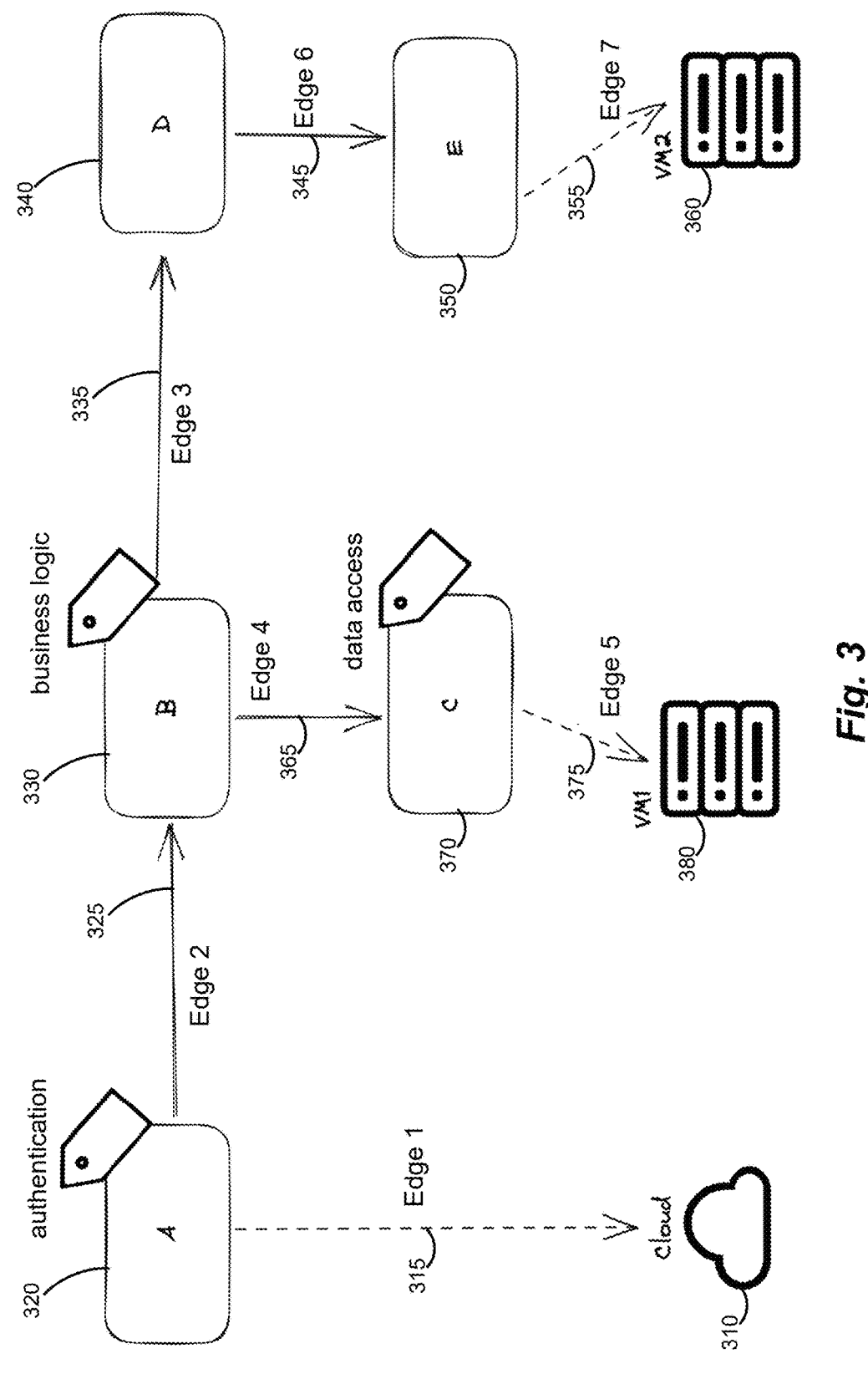
FIG. 3 illustrates an example of graph-path extraction according to some embodiments.

Workflow 200 can continue with vectorizer 250. The vectorizer 250 is configured to generate a distributed representation from contextualized architecture model 245. The distributed representation can be a fixed-size vector. In one embodiment, the vectorizer 250 can performs at least two tasks. The first task is graph-path extraction. In graph-path extraction, all the paths connecting two specified nodes in contextualized architecture model 245 are extracted. This may be done for all the pairs of nodes in the graph which satisfy a pre-established condition. For example, a pre-established condition may be that all paths should be between a minimum and maximum threshold and should contain at least a node or an edge that is impacted by the code change. As another example, the pre-established condition may be that all paths should begin and end with a terminal node and should contain at least a node or edge impacted by the code change. FIG. 3 illustrates an example of graph-path extraction.

A second task performed by the vectorizer 250 is distributed representation generation. Distributed representation generation can include an embedding step to encode each of the elements (nodes or edges) in the extracted paths. In one embodiment, embedding matrices are initialized from the graph nodes and edges vocabulary. Training may be applied to the embedding matrices in order to produce meaningful representations, meaning that similar elements are close to each other in the embedding space. In one example, the embedding matrices may be pre-trained in a mask language model (MLM) fashion in which each of the components in the path is treated analogously as a word in a sentence in natural language. Randomly selected words may then be omitted and the model is trained to predict these omissions using the context provided by the surrounding words (nodes and edges here). Pre-training is applied to a large dataset of architectural models. These models need not be annotated. The result of the encoding step may be a vector representation that corresponds to an extracted path. A global attention mechanism may then aggregate the set of vectors corresponding to the set of extracted paths and generate architecture-aware commit vector 255 which represents potential security risks related to source code changes 230. In one example, architecture-aware commit vector 255 may be a single fixed-size vector. In another example, architecture-aware commit vector 255 may be the architecture-aware commit vector 155 in FIG. 1. Architecture-aware commit vector 255 may then be fed into machine learning pipeline 260, which in some examples, can be machine learning model 160 of FIG. 1.

In some embodiments, annotated architecture model 225 may be saved and utilized for future software code changes made to the software project. For instance during the evaluation of a subsequent commit, contextualiser 240 may receive the stored annotated architecture model 225 along with the code changes in the subsequent commit to analyze the commit without generating the annotated architecture model a second time. To reuse the annotated architecture model in this fashion, changes made to the software code would be used to update the annotated architecture model to keep it up to date. For example in workflow 200, annotated architecture model 225 may be updated to account for code changes 230 since the source code has been changed due to the changes in software code. This update step may occur after anytime after contextualiser 240. For instance, the update step may occur before vectorizer 250, after vectorizer 250, or after machine learning pipeline 260.

FIG. 3 illustrates an example of graph-path extraction according to some embodiments. As shown, contextualized architectural model 300 is a graph structure containing nodes and edges. Node A 320, node B 330, and node C 370 have tags on their top right corner to indicate that they perform functions that may potentially have an impact on security or other vulnerabilities. In the example here, node A 320 provides user authentication functions, node B 330 performs key business logic operations, and node C 370 stores and provides access to business-sensitive data. Some other functions that may be security-relevant include access control, cryptography, injection, design flaws, security misconfiguration, outdated components, identification, authentication, data integrity, monitoring, and server-side forgery.

During graph-path extraction, all the paths connecting two specified nodes in contextualized architecture model 245 are extracted. This may be done for all the pairs of nodes in the graph which satisfy a pre-established condition. The pre-established condition may be that the paths include a node that is both impacted by the source code change and may potentially have an impact on security (i.e., nodes A, B, and C).

Here, let's assume that the code changes impact node A. If the pre-established conditions are that the extracted paths that include terminal nodes (nodes are end points of the graph), include nodes that were impacted the code change, and are a potential security risk, then two paths may be retrieved from the graph-path extraction.

Cloud 310—Edge1 315—NodeA 320—Edge2 325—NodeB 330—Edge4 365—NodeC 370—Edge5 375—VM1 380

Cloud 310—Edge1 315—NodeA 320—Edge2 325—NodeB 330—Edge3 335—NodeD 340—Edge6 345—NodeE 350—Edge7 355—VM2 360

As another example, let's assume that the code changes impact node D. If the pre-established conditions are that the extracted paths that include terminal nodes (nodes are end points of the graph), include nodes that were impacted the code change, and are a potential security risk, then two paths may be retrieved from the graph-path extraction.

VM1 380—Edge5 375—NodeC 370—Edge4 365—NodeB 330—Edge3 335—NodeD 340—Edge6 345—NodeE 350—Edge7 355—VM2 360

Cloud 310—Edge1 315—NodeA 320—Edge2 325—NodeB 330—Edge3 335—NodeD 340—Edge6 345—NodeE 350—Edge7 355—VM2 360

These two paths above are then transformed to distributed representations using the pre-trained embedding matrices. Next, the attention mechanism aggregates them into a single vector. This vector can then be fed to a machine learning model which has been trained to identify vulnerability-related changes. The choice of the classifier is open, ranging from simple linear classifiers to complex highly non-linear ones. Furthermore, one can decide to keep this representation fixed or fine-tune it and allow it to evolve. In some examples, the dataset can be split into three sets: the training set which is used to fit the model parameters, the validation set which is used for the hyperparameter tuning, and the test set which is used to objectively assess the performance of the classifier.

Figure 4:
FIG. 4 illustrates a workflow according to some embodiments.
Figure 4:
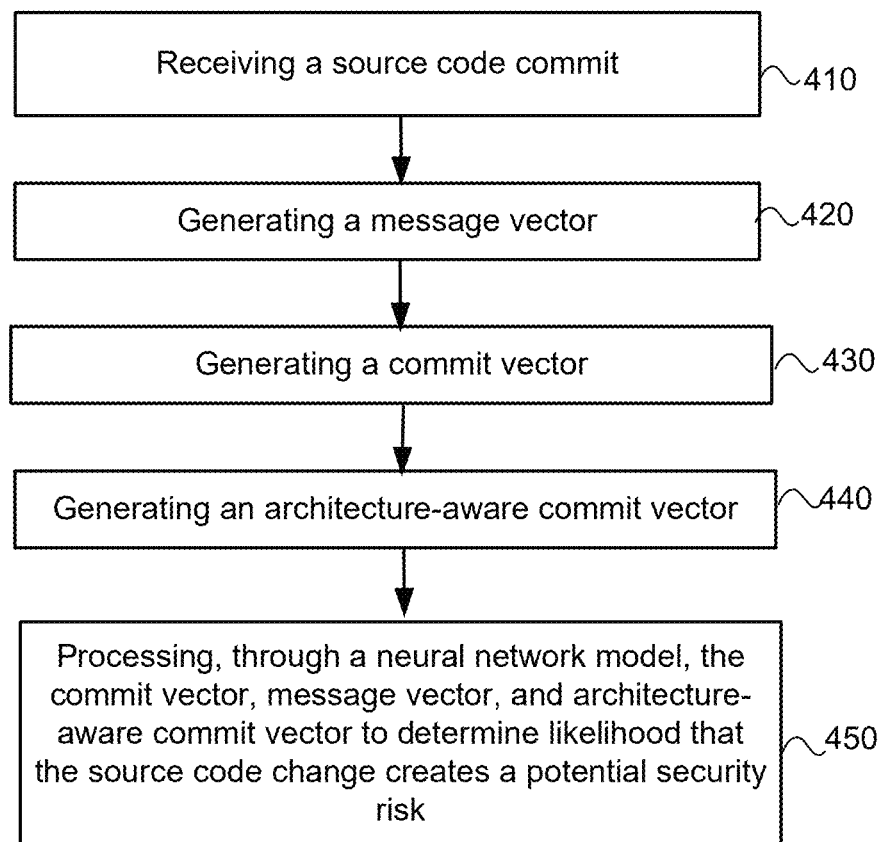

FIG. 4 illustrates a workflow according to some embodiments. Workflow 400 begins by receiving a source code commit at step 410. The source code commit may include at least one source code change to a source code repository and a message in natural language describing the at least one source code change. Workflow 400 can continue by generating a message vector at step 420. The message vector may be based on the message portion of the source code commit. Workflow 400 can continue by generating a commit vector at 430. The commit vector may be based on the at least one source code change. In one example, the commit vector may be generated by processing the at least one source code change through a neural network model.

Workflow 400 can continue by generating an architecture-aware commit vector at 440. The architecture-aware commit vector may be based on the at least one source code change and an annotated architectural model of the source code repository. In one embodiment, the annotated architectural model is generated by first analyzing the source code repository to extract the architecture model and then annotating the architecture model to point out or highlight architecture elements that may have a potential security risk or vulnerability. The annotation can be automated through a security analyzer tool, manually through a security architect, or a combination of the two. In another embodiment, the annotated architecture model is retrieved from memory to be used to generate the architecture-aware commit vector, updated to account for the source code change, and then stored again in memory for future use.

Workflow 400 can continue by processing, through a neural network model, the commit vector, message vector, and architecture-aware commit vector to determine the likelihood that the source code change creates a potential security risk or vulnerability at 450. The output of the neural network model may be a value between 0 and 1 with 0 being very unlikely and 1 being highly likely that the software code change creates a potential security risk or vulnerability. In one embodiment, a commit containing a source code change that has a high likelihood of creating a security risk may be flagged for additional analysis. In another embodiment, a commit containing a source code change that has a high likelihood of creating a security risk may not be deployed in the target system.

Figure 5:
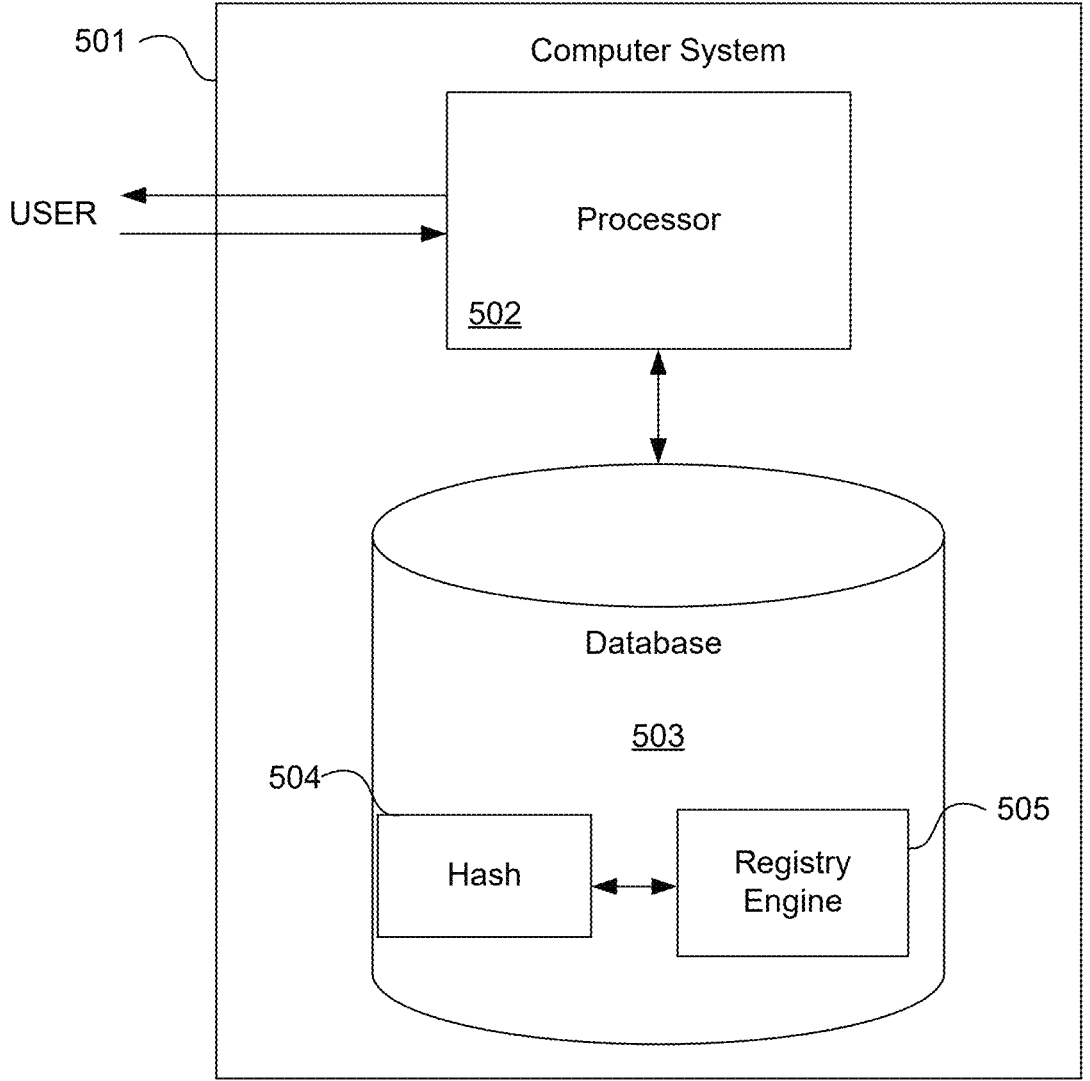
FIG. 5 illustrates hardware of a special purpose computing machine configured to implement a code commit registry according to some embodiments.

FIG. 5 illustrates hardware of a special purpose computing machine configured to implement a code commit registry according to some embodiments. In particular, computer system 501 comprises a processor 502 that is in electronic communication with a non-transitory computer-readable storage medium comprising a database 503. This computer-readable storage medium has stored thereon code 505 corresponding to a registry engine. Code 504 corresponds to a hash. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Embodiments as described herein may offer one or more advantages. One potential benefit is enhanced cooperation with prospective customers and vendors. That is, customers are free to engage vendors to develop valuable add-ons, which can then be relied on to operate seamlessly with a basic framework.

Figure 6:
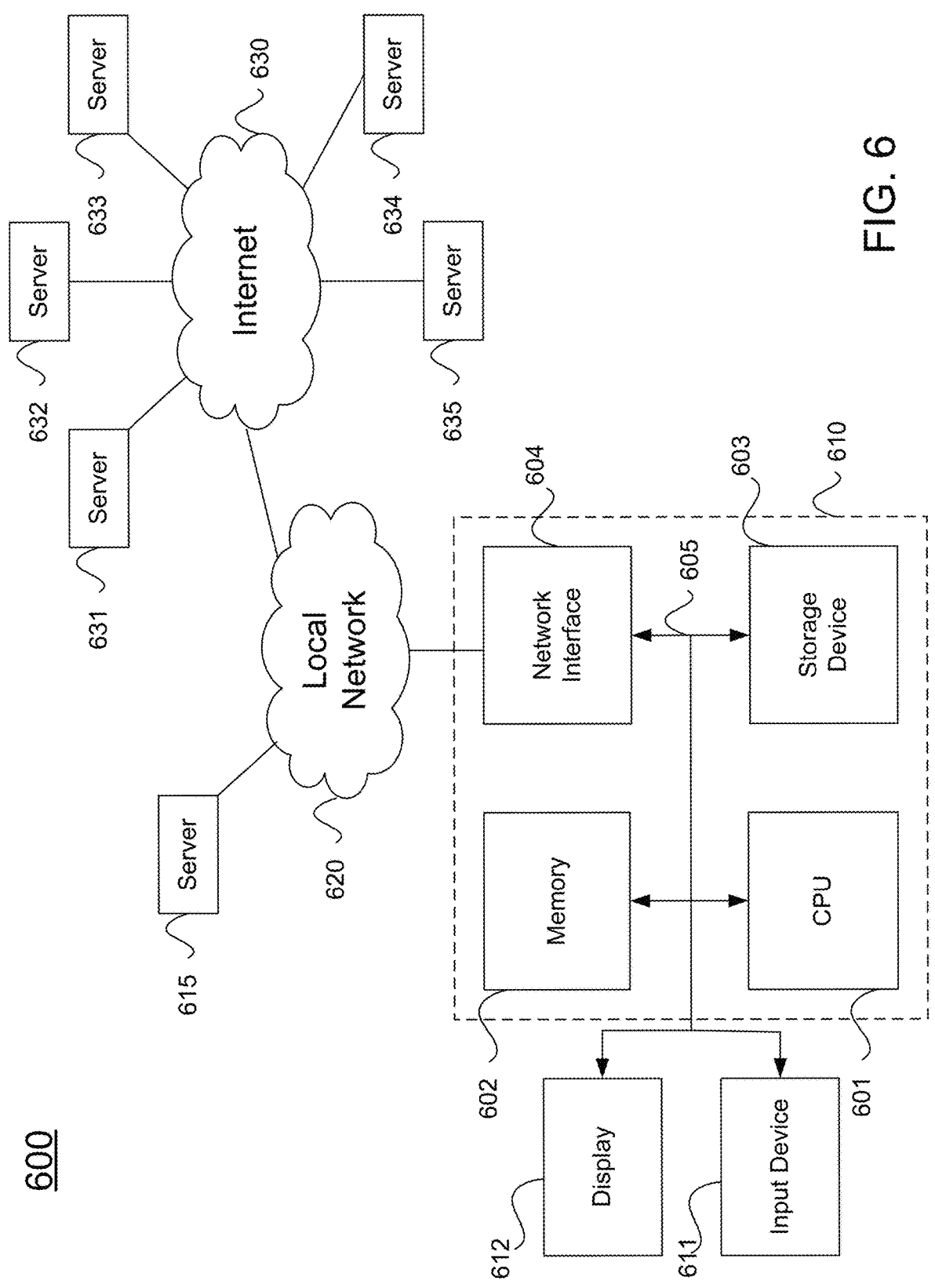
FIG. 6 shows an example computer system.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a Light Emitting Diode (LED) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method for receiving a source code commit, the source code commit including at least one source code change to a source code repository and a message in natural language describing the at least one source code change, generating a message vector based on the message, generating a commit vector based on the at least one source code change, generating an architecture-aware commit vector based on the at least one source code change and an annotated architecture model of the source code repository, and processing, through a neural network model, the message vector, the commit vector, and the architecture-aware commit vector to determine a likelihood that the at least one source code change creates a potential security risk.

In one embodiment, generating the message vector includes processing the message through a natural language model.

In one embodiment, generating the commit vector includes processing the at least one source code change through a second neural network model.

In one embodiment, a proof result is associated with a portion of the software artifact.

In one embodiment, generating the architectural-aware commit vector includes identifying an architecture element in the annotated architecture model that is associated with the at least one source code change, extracting at least one path in the annotated architecture model that pass through the architecture element, and aggregating the at least one extracted path to generate the architecture-aware commit vector.

In one embodiment, generating the architectural-aware commit vector further includes extracting a source code tree from the source code repository, generating an architecture model from the source code tree, and annotating the architecture model to identify at least one architecture element in the architecture model that is a potential security risk.

In one embodiment, the extracted paths connect two terminal nodes in the annotated architecture model.

In one embodiment, the method further comprising updating the annotated architecture model according to the at least one source code change.

In one embodiment, aggregating the at least one extracted path includes encoding each path of the at least one extracted path to generate a corresponding vector representation.

In one embodiment, aggregating the at least one extracted path further includes aggregating the vector representations that correspond to the at least one extracted path.

In some embodiments the present disclosure includes a system comprising: one or more processors, a non-transitory computer-readable medium storing a program executable by the one or more processors, the program comprising sets of instructions for: receiving a source code commit, the source code commit including at least one source code change to a source code repository and a message in natural language describing the at least one source code change, generating a message vector based on the message, generating a commit vector based on the at least one source code change, generating an architecture-aware commit vector based on the at least one source code change and an annotated architecture model of the source code repository, and processing, through a neural network model, the message vector, the commit vector, and the architecture-aware commit vector to determine a likelihood that the at least one source code change creates a potential security risk.

In some embodiments, the present disclosure includes a non-transitory computer-readable medium storing a program executable by one or more processors, the program comprising sets of instructions for: receiving a source code commit, the source code commit including at least one source code change to a source code repository and a message in natural language describing the at least one source code change, generating a message vector based on the message, generating a commit vector based on the at least one source code change, generating an architecture-aware commit vector based on the at least one source code change and an annotated architecture model of the source code repository, and processing, through a neural network model, the message vector, the commit vector, and the architecture-aware commit vector to determine a likelihood that the at least one source code change creates a potential security risk.

What is claimed is:

1. A method comprising:
   receiving a source code commit, the source code commit including at least one source code change to a source code repository and a message in natural language describing the at least one source code change;
   generating a message vector based on the message;
   generating a commit vector based on the at least one source code change;
   generating an architecture-aware commit vector based on the at least one source code change and an annotated architecture model of the source code repository, wherein generating the architecture-aware commit vector includes:
   identifying an architecture element in the annotated architecture model that is associated with the at least one source code change, wherein at least one annotation of the annotated architecture model identifies at least one architecture element in the architecture model that is a potential security risk and includes security-related information;
   extracting at least one path in the annotated architecture model that passes through the architecture element; and
   aggregating the at least one extracted path to generate the architecture-aware commit vector; and
   processing, through a multiple input neural network model, the message vector, the commit vector, and the architecture-aware commit vector to determine a likelihood that the at least one source code change creates a potential security risk.

2. The method as in claim 1, wherein generating the message vector includes processing the message through a natural language model.

3. The method as in claim 1, wherein generating the commit vector includes processing the at least one source code change through a second neural network model.

4. The method as in claim 1, wherein generating the architecture-aware commit vector further includes:
   extracting a source code tree from the source code repository;

generating an architecture model from the source code tree; and annotating the architecture model to identify at least one architecture element in the architecture model that is a potential security risk.

5. The method as in claim 1, wherein the at least one extracted path connects two terminal nodes in the annotated architecture model.

6. The method as in claim 4, further comprising updating the annotated architecture model according to the at least one source code change.

7. The method as in claim 1, wherein aggregating the at least one extracted path includes encoding each path of the at least one extracted path to generate a corresponding vector representation.

8. The method as in claim 7, wherein aggregating the at least one extracted path further includes aggregating the vector representations that correspond to the at least one extracted path.

9. A system comprising:

one or more processors;

a non-transitory computer-readable medium storing a program executable by the one or more processors, the program comprising sets of instructions for:

receiving a source code commit, the source code commit including at least one source code change to a source code repository and a message in natural language describing the at least one source code change;

generating a message vector based on the message;

generating a commit vector based on the at least one source code change;

generating an architecture-aware commit vector based on the at least one source code change and an annotated architecture model of the source code repository, wherein generating the architecture-aware commit vector includes:

identifying an architecture element in the annotated architecture model that is associated with the at least one source code change, wherein at least one annotation of the annotated architecture model identifies at least one architecture element in the architecture model that is a potential security risk and includes security-related information;

extracting at least one path in the annotated architecture model that passes through the architecture element; and aggregating the at least one extracted path to generate the architecture-aware commit vector; and processing, through a multiple input neural network model, the message vector, the commit vector, and the architecture-aware commit vector to determine a likelihood that the at least one source code change creates a potential security risk.

10. The system of claim 9, wherein generating the architecture-aware commit vector further includes:

extracting a source code tree from the source code repository;

generating an architecture model from the source code tree; and annotating the architecture model to identify at least one architecture element in the architecture model that is a potential security risk.

11. The system of claim 9, wherein the program further comprises sets of instructions for updating the annotated architecture model according to the at least one source code change.

12. The system of claim 9, wherein aggregating the at least one extracted path includes encoding each path of the at least one extracted path to generate a corresponding vector representation.

13. The system of claim 12, wherein aggregating the at least one extracted path further includes aggregating the vector representations that correspond to the at least one extracted path.

14. A non-transitory computer-readable medium storing a program executable by one or more processors, the program comprising sets of instructions for:

receiving a source code commit, the source code commit including at least one source code change to a source code repository and a message in natural language describing the at least one source code change;

generating a message vector based on the message;

generating a commit vector based on the at least one source code change;

generating an architecture-aware commit vector based on the at least one source code change and an annotated architecture model of the source code repository, wherein generating the architecture-aware commit vector includes:

identifying an architecture element in the annotated architecture model that is associated with the at least one source code change, wherein at least one annotation of the annotated architecture model identifies at least one architecture element in the architecture model that is a potential security risk and includes security-related information;

extracting at least one path in the annotated architecture model that passes through the architecture element; and aggregating the at least one extracted path to generate the architecture-aware commit vector; and processing, through a multiple input neural network model, the message vector, the commit vector, and the architecture-aware commit vector to determine a likelihood that the at least one source code change creates a potential security risk.

15. The non-transitory computer-readable medium of claim 14, wherein generating the architecture-aware commit vector further includes:

extracting a source code tree from the source code repository;

generating an architecture model from the source code tree; and annotating the architecture model to identify at least one architecture element in the architecture model that is a potential security risk.

16. The non-transitory computer-readable medium of claim 15, further comprising updating the architecture model according to the at least one source code change.

17. The non-transitory computer-readable medium of claim 14, wherein aggregating the at least one extracted path includes encoding each path of the at least one extracted path to generate a corresponding vector representation.

18. The method of claim 1, wherein the at least one annotation of the annotated architecture model identifies that the architecture element is a source or sink of sensitive data, a data storage element, a component or communication channel that is protected by authentication, or authorization, or encryption, and a channel that crosses a trust boundary.

* * * * *